(12) United States Patent
Hopt et al.

(10) Patent No.: US 7,673,798 B2
(45) Date of Patent: Mar. 9, 2010

(54) CARD READER WITH SYMMETRICAL CONTACT SPRING

(75) Inventors: Karl-Rudolf Hopt, Rottweil (DE); Jürgen Hopt, Rottweil (DE)

(73) Assignee: ddm hopt + schuler GmbH & Co. KG, Rottweil (DE)

( * ) Notice: Subject to any disclaimer, the term of this patent is extended or adjusted under 35 U.S.C. 154(b) by 217 days.

(21) Appl. No.: 11/455,582

(22) Filed: Jun. 19, 2006

(65) Prior Publication Data

US 2006/0289643 A1 Dec. 28, 2006

(30) Foreign Application Priority Data

Jun. 23, 2005 (EP) .................... 05013526

(51) Int. Cl.
 *G06K 7/06* (2006.01)
(52) U.S. Cl. .................. 235/441; 235/492; 439/260
(58) Field of Classification Search .............. 235/441, 235/492; 439/260
 See application file for complete search history.

(56) References Cited

U.S. PATENT DOCUMENTS

| | | | |
|---|---|---|---|
| 5,207,598 A * | 5/1993 | Yamada et al. ............ 439/636 |
| 6,068,514 A * | 5/2000 | Zuin ........................ 439/630 |
| 6,238,226 B1 * | 5/2001 | Schempp et al. ............ 439/260 |
| 6,568,955 B2 * | 5/2003 | Hotea et al. ................. 439/495 |
| 2001/0005645 A1 * | 6/2001 | Zech et al. .................. 439/188 |
| 2003/0166354 A1 | 9/2003 | Tsing |

FOREIGN PATENT DOCUMENTS

| | | |
|---|---|---|
| EP | 0 803 835 A2 | 10/1997 |
| EP | 0 803 835 A3 | 10/1997 |
| WO | WO 2004/068391 A1 | 8/2004 |

\* cited by examiner

*Primary Examiner*—Michael G Lee
*Assistant Examiner*—Rafferty Kelly
(74) *Attorney, Agent, or Firm*—Walter A. Hackler

(57) ABSTRACT

A card reader comprises two rows of electric contacts in the form of elastically deformable contact springs for contacting the electric contact fields of a card inserted into the card reader, wherein the contact springs extend parallel to the card insertion direction and wherein each contact spring comprises a contact section projecting into the card path for contacting one of the contact fields of the card, a connecting section for connecting to a write/read device, an intermediate U-shaped joining section, and a mounting section for mounting the contact spring to the card reader housing, all being formed in one piece with the contact spring. In accordance with the invention, the contact section, the U-shaped joining section and the mounting section are symmetrical relative to the center plane of the contact spring.

13 Claims, 1 Drawing Sheet

CARD READER WITH SYMMETRICAL CONTACT SPRING

This application claims Paris Convention priority of EP 05 013 526.8 filed 23 Jun. 2005, the complete disclosure of which is hereby incorporated by reference.

BACKGROUND OF THE INVENTION

The present invention relates to a card reader with two rows of electric contacts in the form of elastically deformable contact springs for contacting the electric contact fields of a card which is inserted into the card reader, wherein the contact springs extend parallel to the card insertion direction, and wherein each contact spring comprises a contact section projecting into the card path for contacting one of the contact fields of the card, a connecting section for connecting to a write/read device, an intermediate U-shaped joining section and a mounting section for mounting the contact spring to the contact carrier, all being formed in one piece with the contact spring.

A card reader of this type is disclosed e.g. in EP 0 803 835 A2.

Each contact spring of this conventional card reader comprises a mounting section for mounting to the card reader housing, which is laterally or transversely offset from the contact and connecting sections of the contact spring and is inserted (shot) into a corresponding opening of the card reader. This transverse offset increases the space required by the contact springs in the transverse direction, and moreover transverse forces are generated between the contact and mounting sections when a card is being inserted, which could incline the contact section.

In contrast thereto, it is the underlying object of the present invention to reduce the space required by the contact springs of a card reader of the above-mentioned type, and effectively eliminate the transverse forces acting on the contact springs.

SUMMARY OF THE INVENTION

This object is achieved in accordance with the invention in that the contact section, the U-shaped joining section and the mounting section are symmetrical relative to the center plane of the contact spring.

When the connecting section is also symmetrical relative to the center plane of the contact spring, the space required by the contact spring in the transverse direction is minimized.

In a first, particularly preferred embodiment, the U-shaped joining section of the contact springs of at least one contact row is formed by two transversely spaced apart, parallel U-shaped arms which extend from the mounting section in a direction opposite to the card insertion direction, while the connecting section extends from the mounting section between the two U-shaped arms in a direction opposite to the card insertion direction. The mounting section of the contact spring is preferably formed like a frame and the contact section of the contact spring is disposed in the frame opening. The mounting section of the contact spring moreover preferably extends to a central web of the contact carrier, which is provided between the two contact rows.

In another preferred embodiment, the U-shaped joining section of the contact springs of at least one contact row is formed by one single U-shaped arm. The mounting section is preferably formed like a frame and the contact section of the contact spring is disposed in the frame opening. The mounting section of the contact spring moreover preferably extends to a transverse web of the contact carrier which is provided in front of the contact row, as viewed in the card insertion direction.

In advantageous embodiments of the inventive card reader, the U-shaped joining section of the contact springs of one or both contact rows faces in a direction opposite to the card insertion direction. In the latter case, the contact springs are arranged in the shape of a double-C, wherein the free ends of all contact sections face in the insertion direction and are not jolted but only resiliently deflected when a card is being inserted.

The connecting sections of the two contact rows preferably face away from each other.

Further advantages of the invention can be extracted from the description and the drawing. The features mentioned above and below may be used individually or collectively in arbitrary combination. The embodiment shown and described is not to be understood as exhaustive enumeration but has exemplary character for describing the invention.

DESCRIPTION OF THE PREFERRED EMBODIMENT

Figure 1:
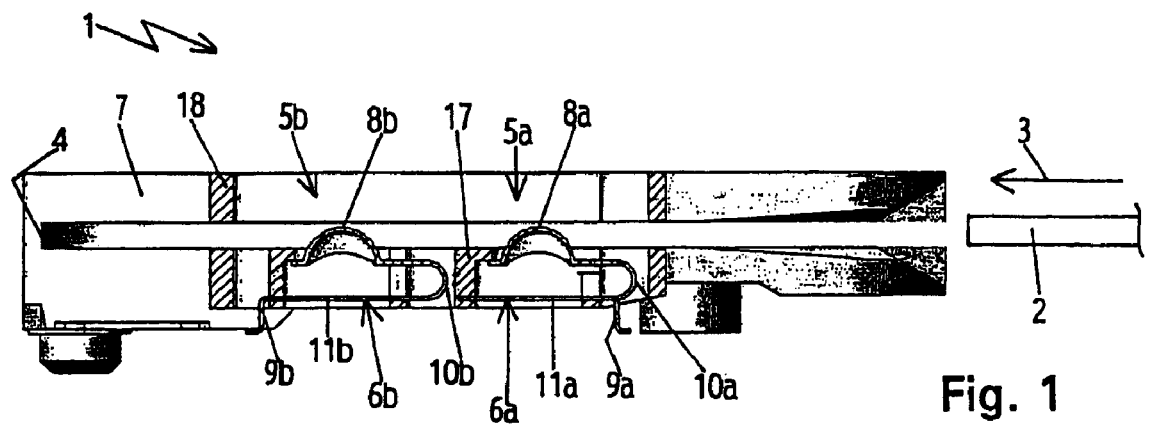
FIG. 1 shows a longitudinal section through the inventive card reader with contact springs being arranged in the shape of a double C.

Reference numeral 1 of FIG. 1 designates a so-called push/pull card reader, wherein a user inserts a card 2 into the card reader 1 in the insertion direction 3 until the card abuts a card stop 4 in its data exchange position, and pulls it out again of the card reader 1 after data exchange. The card 2 has a microchip (not shown) for storing data, whose contacts are provided in the form of electric contact fields (not shown) on the card surface.

The card reader 1 has two rows 5*a*, 5*b*, disposed behind each other in the card insertion direction 3, of electric contacts in the form of elastically deformable contact springs 6*a*, 6*b* for contacting the electric contact fields of the card 2 inserted into the card reader 1. The contact springs 6*a*, 6*b* extend parallel to the card insertion direction 3 and are mounted to the card reader housing 7 which is an injection-molded plastic part.

Each contact spring 6*a*, 6*b* comprises a contact section 8*a*, 8*b* projecting into the card path, for contacting one of the contact fields of the card 2, a connecting section 9*a*, 9*b* for connecting a write/read device (not shown) of the card reader 1, an intermediate U-shaped joining section 10*a*, 10*b* and a mounting section 11*a*, 11*b* for mounting the contact spring 6*a*, 6*b* to the card reader housing 7, all being formed in one piece with the contact spring 6*a*, 6*b*. The contact section 8*a*, 8*b* is calotte-shaped and the connecting section 9*a*, 9*b* is formed as SMD contact.

Figure 2:
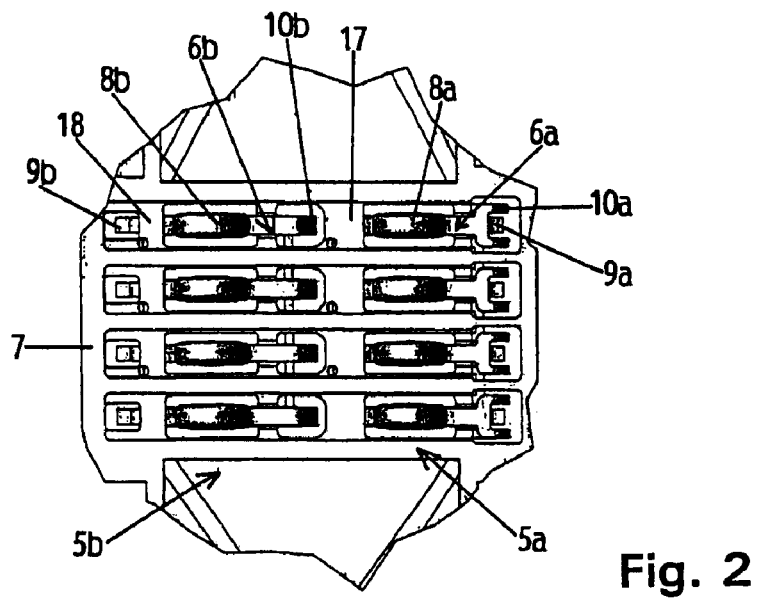
FIG. 2 shows a top view of the inventive card reader in the region of the contact springs.

The contact sections 8*a*, 8*b* and the U-shaped joining sections 10*a*, 10*b* of the contact springs 6*a*, 6*b* of both contact rows 5*a*, 5*b* are aligned in the same direction, i.e. the free ends of the contact sections 8*a*, 8*b* face in the card insertion direction 3, i.e. to the left-hand side in FIG. 2, and the U-shaped joining sections 10*a*, 10*b* are oriented in a direction opposite to the card insertion direction 3, i.e. are provided on the right-hand side. In other words, the contact springs 6*a*, 6*b* of both contact rows 5a, 5b are disposed in the shape of a double C, wherein the connecting sections 9a, 9b of the two contact rows 5a, 5b face away from each other.

As is shown in FIG. 2, the contact section 8a, 8b, the connecting section 9a, 9b and the U-shaped joining section 10a, 10b of each contact spring 6a, 6b are in the same plane extending at a right angle to the card path and card insertion direction 3. The contact, connecting and joining sections 8a, 9a, 10a of a contact spring 6a of one contact row 5a and the contact, connecting and joining sections 8b, 9b, 10b of a contact spring 6b of the other contact row 5b are thereby in the same plane.

Figure 3:
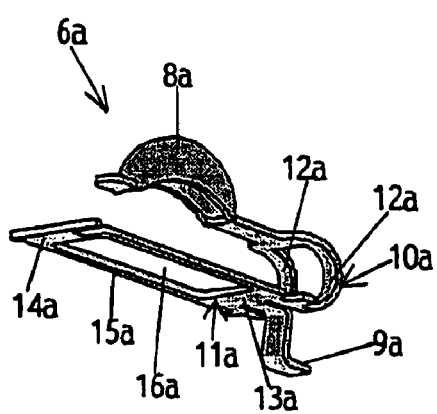
FIGS. 3 and 4 show two different designs of contact springs of the inventive card reader.

As is shown in FIG. 3, the U-shaped joining section 10a of the contact springs 6a of the rear contact row 5a, as viewed in the card insertion direction 3, is formed by two parallel U-shaped arms 12a which are spaced apart in a transverse direction and extend from a transverse web 13a of the mounting section 11a in a direction opposite to the card insertion direction 3. The connecting section 9a also extends from this transverse web 13a between the two arms 12a in a direction opposite to the card insertion direction 3, i.e. the connecting section 9a is provided on the contact spring 6a on the side of the U-shaped joining section 10a. The mounting section 11a is formed like a frame and comprises, in addition to the transverse web 13a, also the transverse web 14a and the two side legs 15a, wherein the contact section 8a is above the frame opening 16a or, in the top view of FIG. 2, within the frame opening 16a. The mounting section 11a whose transverse web 14a extends to a central web 17 (FIG. 2) of the card reader housing 7 provided between the two contact rows 5a, 5b, is an insert which is completely surrounded by injection-molded plastic material during production of the card reader housing 7. The contact section 8a, the connecting section 9a, the U-shaped joining section 10a and the mounting section 11a are symmetrical relative to the center plane of the contact spring 6a, such that no transverse forces can be generated in the contact spring 6a and the transverse dimension of the contact spring 6a is minimized.

Figure 4:
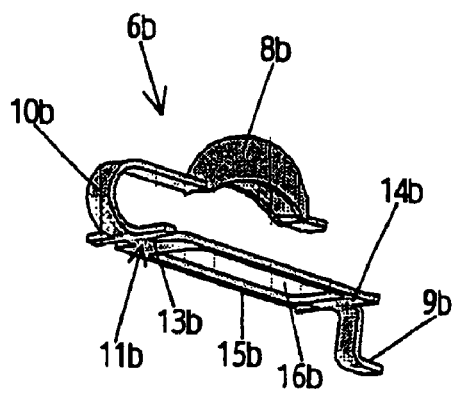

As is shown in FIG. 4, the U-shaped joining section 10b of the contact springs 6b of the front contact row 5b, as viewed in the card insertion direction 3, is formed by one single U-shaped arm. The mounting section 11b has the shape of a frame comprising the two transverse webs 13b, 14b and the two side legs 15b, wherein the contact section 8b is above the frame opening 16b or within the frame opening 16b as shown in the top view of FIG. 2. The U-shaped connecting section 10b extends from the transverse web 13b of the mounting section 11b in a direction opposite to the card insertion direction 3, while the connecting section 9b extends from the transverse web 14b in the card insertion direction 3, i.e. is provided on the contact spring 6b on the other side of the U-shaped connecting section 10b. The mounting section 11b whose transverse web 14b extends to a further transverse web 18 of the card reader housing 7 is an insert which is completely surrounded by injection-molded plastic material during production of the card reader housing 7. The contact section 8b, the connecting section 9b, the U-shaped joining section 10b and the mounting section 11b are symmetrical relative to the center plane of the contact spring 6b such that no transverse forces can be generated in the contact spring 6b and the transverse dimension of the contact spring 6b is minimized.

We claim:

1. Push/pull card reader for contacting electric contact fields of a card inserted into the card reader, the contact fields being provided at the same flat side of the card comprising a first row of parallel electric contacts and a second row of parallel electric contacts in the form of elastically deformable contact springs for contacting the electric contact fields of an inserted card wherein one row is disposed behind the other row in the card insertion direction and at the same flat side of the inserted card, wherein the contact springs extend parallel to a card insertion direction and wherein each contact spring comprises a contact section projecting into a card path for contacting one of the contact fields of the card, a connecting section for connecting to a write/read device, an intermediate U-shaped joining section and a mounting section for mounting the contact spring to the card reader housing, all being formed in one piece with the contact spring, wherein the sections of each contact spring are provided at the same side of the card path wherein the contact section, the U-shaped joining section and the mounting section are symmetrical relative to the center plane of the contact spring and wherein the U-shaped joining section of each contact spring of one contact row is formed by two parallel U-shaped arms which are spaced apart in a transverse direction and extends from the mounting section in a direction opposite to the card insertion direction, and the connecting section of each contact spring of the one contact row extends from the mounting section between the two U-shaped arms in a direction opposite to the card insertion direction.

2. Push/pull card reader according to claim 1, wherein the connecting section is also symmetrical relative to the center plane of the contact spring.

3. Push/pull card reader according to claim 2, wherein the U-shaped joining section of each contact spring of one contact row is formed by two parallel U-shaped arms which are spaced apart in a transverse direction and extends from the mounting section in a direction opposite to the card insertion direction, and the connecting section of each contact spring of the one contact row extends from the mounting section between the two U-shaped arms in a direction opposite to the card insertion direction, wherein the mounting section of each contact spring of the one contact row has the shape of a frame and the contact section of the contact spring is in the frame opening, and wherein the mounting section of each contact spring of the one contact row extends to a central web of the card reader housing provided between the two contact rows.

4. Push/pull card reader according to claim 2, wherein the U-shaped joining section of each contact spring of the other contact row is formed by one single U-shaped arm, wherein the mounting section of each contact spring of the other row has the shape of a frame and the contact section of the contact spring is in the frame opening, and wherein the mounting section of each contact spring of the other contact row extends to a transverse web of the card reader housing, provided in front of the contact row, as viewed in the card insertion direction.

5. Push/pull card reader according to claim 4, wherein the U-shaped joining section of each contact spring of one or both contact rows is oriented in a direction opposite to the card insertion direction, and wherein the connecting sections of the two contact rows face away from each other.

6. Push/pull card reader according to claim 1, wherein the mounting section of contact spring of the one contact row has the shape of a frame and the contact section of contact spring is in the frame opening.

7. Push/pull card reader according to claim 1, wherein the mounting section of each contact spring of the contact row extends to a central web of the card reader housing provided between the two contact rows.

8. Push/pull card reader according to claim 1, wherein the U-shaped joining section of each contact spring of the other contact row is formed by one single U-shaped arm.

9. Push/pull card reader according to claim 8, wherein the mounting section has the shape of a frame and the contact section of each contact spring of the other contact row is in the frame opening.

10. Push/pull card reader according to claim 8, wherein the mounting section of each contact spring of the other contact row extends to a transverse web of the card reader housing, provided in front of the contact row, as viewed in the card insertion direction.

11. Push/pull card reader according to claim 1, wherein the U-shaped joining section of the contact springs of one or both contact rows is oriented in a direction opposite to the card insertion direction.

12. Push/pull card reader according to claim 1, wherein the connecting sections of the two contact rows face away from each other.

13. Push/pull card reader according to claim 1, wherein the connecting sections of the two contact rows are surface mount device (SMD) contacts.

* * * * *